United States Patent

[11] 3,604,678

| [72] | Inventor | Hans Gram |
| | | Vojens, Denmark |
| [21] | Appl. No. | 808,415 |
| [22] | Filed | Mar. 19, 1969 |
| [45] | Patented | Sept. 14, 1971 |
| [73] | Assignee | Brodrene Gram A/S |
| | | Vojens, Denmark |
| [32] | Priority | Mar. 21, 1968 |
| [33] | | Denmark |
| [31] | | 1214/68 |

[54] APPARATUS FOR WITHDRAWING FROZEN ARTICLES OR BODIES FROM A FREEZING MOLD
1 Claim, 3 Drawing Figs.

[52] U.S. Cl. .................................... 249/66, 107/8 A
[51] Int. Cl. .................................... B28b 7/10
[50] Field of Search .................................... 249/66, 67, 68, 69, 70, 71, 72, 73, 74, 75, 76; 107/8 A, 8 B; 264/232

[56] References Cited
UNITED STATES PATENTS

| 1,041,033 | 10/1912 | Crist .................................... | 249/74 |
| 2,741,104 | 4/1956 | Sasnett et al. .................................... | 249/66 X |

FOREIGN PATENTS

| 942,618 | 5/1956 | Germany .................................... | 249/66 |

Primary Examiner—J. Spencer Overholser
Assistant Examiner—L. R. Frye
Attorney—Watson, Cole, Grindle & Watson ABSTRACT: An apparatus for removing frozen articles of inhomogeneous materials from a mold, comprising a pickup member having a grooved lower surface which is frozen to the upper surface of the article in such a way that an adherence between the frozen material and the grooved side of the pickup member of such a strength is obtained that this adherence can be used for lifting the article away from the mold.

PATENTED SEP 14 1971 3,604,678

INVENTOR
Hans Gram
BY
Watson, Cole, Grindle & Watson
ATTORNEY

APPARATUS FOR WITHDRAWING FROZEN ARTICLES OR BODIES FROM A FREEZING MOLD

BACKGROUND OF THE INVENTION

The invention relates to an apparatus for withdrawing frozen articles or bodies from a freezing mold, and of the kind which comprises a pickup member one side of which is to be frozen to a surface area of the article or body.

A pickup member is known the side of which to be frozen to a surface area of the article is flat and devoid of projections. Said pickup member is used when removing frozen bodies of ice cream, and the reliable operation of this known pickup member is due to the fact that an intimate adhesion will arise between the smooth lower side of the pickup member and the ice cream which after the freezing and a loosening by thawing of the body relative to the mold is sufficient to lift the body out of the mold.

In experiments which form the basis of this invention it has been attempted to use pickup members of the kind referred to above for withdrawing articles frozen from nonhomogeneous and nonfluid or plastic materials, such as vegetables in the form of spinach and peas and materials having a similar fibrous or piecelike consistency. These experiments show, however, that it is not possible to obtain an adherence between the pickup member and the article which is sufficient to lift the article. This is thought to be due to the fact that between the lower side of the pickup member and the upper side of the material placed in the mold there will only be contact at certain points on account of the fibrous or piecelike consistency of the material, and said comparatively small contact is not sufficient to obtain the necessary freezing contact.

It is the object of this invention to devise an apparatus of the type in question where when freezing one side of the pickup member to a surface area of the article the required adherence is obtained notwithstanding that materials having a fibrous or piecelike consistency are dealt with.

SUMMARY OF THE INVENTION

According to the invention, the side of the pickup member to be frozen to the surface area of the article is provided with grooves. Surprisingly, it has been found that the increase of the surface of the side in question obtained by providing it with grooves is sufficient to give it the supplement of adhesive power which is necessary to ensure a lifting of the frozen article out of the mold. This is supposed to be due to the fact that the projections located between the grooves when placing the pickup member on the surface of the material, will form recesses in the same and thus will create compressions in the surface of the material opposite the projections so that along the same there will be a far more intimate contact with the material than in case of a flat surface. To this must be added that the material will also to some extent be pressed into the grooves which will increase the adhesive power, and this increase of the adhesive power is sufficient to obtain the desired function.

In the experiments which form the basis of the invention it has been found that the best adhesion is obtained when the grooves have a U-shaped section with a rather flat bottom, and when the projections that separate the grooves have a rather flat shape.

Further features of the invention will be apparent from the following detailed description of an embodiment.

DESCRIPTION OF THE PREFERRED EMBODIMENT

Figure 1:
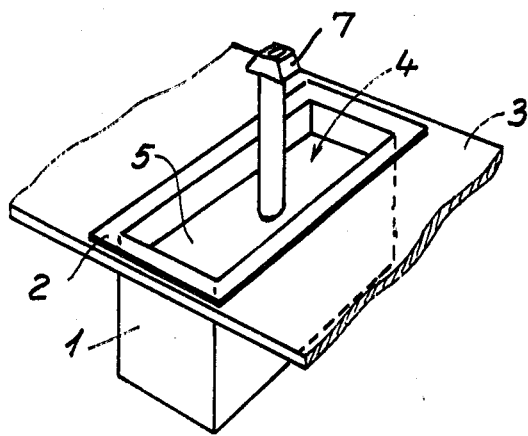
FIG. 1 schematically shows an apparatus according to an embodiment of the invention with its pickup member placed in a mold, FIG. 2 the same after an article has been frozen, loosened from the mold by thawing and partly lifted by means of the pickup member, and FIG. 3 the pickup member viewed in inverted position.

In the drawing, 1 is a freezing mold which is open at the top end and the upper edge of which is surrounded by a flange 2 resting against the upper side of a table 3 through which the mold is inserted.

The pickup member is designated by 4 and consists of a plate 5 and a tube 6 opening at the lower side of the plate 5, and the upper end of which is provided with a projection 7. The apparatus further comprises a gripping device (not shown) adapted to grip the projection 7 so that the pickup member can be lifted to remove an article 8 frozen in the mold 1.

Figure 3:
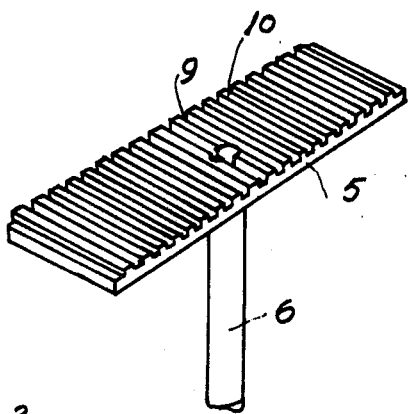

The plate 5 is grooved along its lower side as will appear from FIG. 3, viz by means of U-shaped grooves 9 having a comparatively flat bottom separated by means of flat-topped projecting ridges 10. The ridges 10 are practically speaking just as wide as the bottoms of the grooves 9, and in the embodiment shown the ridges have comparatively sharp edges.

Figure 2:
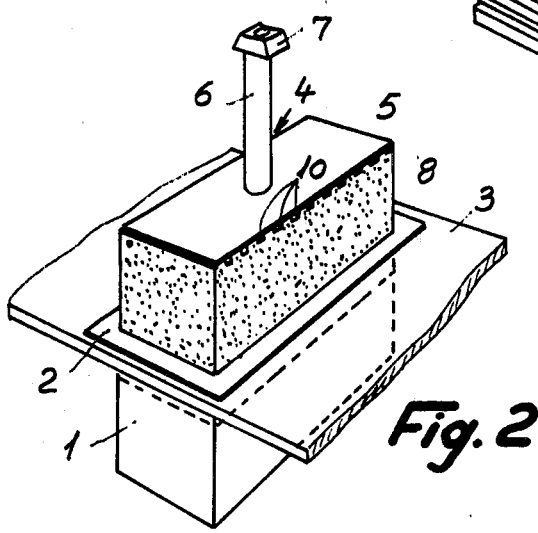

When the apparatus is used the material to be frozen is filled into the freezing mold 2 so that the latter is partly filled. The material to be frozen is nonhomogeneous freezing material, e.g., vegetables such as spinach or other yielding vegetables or meat nonchopped or in other words fibrous or coarsely grained material. It will be understood that after the filling of the mold the material will form a rather uneven surface so that upon introduction of the pickup member into the mold only a poor contact would exist between the upper surface of the freezing material and the lower side of the pickup member if the pickup member 4 had a flat and smooth lower side. By means of the grooved shape illustrated there will, however, be effected a compression along the ridges of the material so as to establish along the ridges an intimate contact with the material, and the latter will at least to some extent be pressed into the grooves so that after the freezing process so great an adhesive power will have been obtained that the latter may be used for withdrawing the frozen article from the mold. The lifting of the article is shown in FIG. 2, where the article by means of an upwardly directed pull applied to the projection 7 and according to the pickup member has been lifted upwards by means of the above-mentioned gripping device after the article 8 has been loosened relative to the walls of the mold 1 by a short-thawing process. During the said lifting operation of the pickup member the frozen article 8 will be withdrawn due to the strong adherence to the lower side of the plate 5.

When the article 8 has been lifted out the latter may be released from the plate 5 of the pickup member, e.g., by a short treatment of the plate 5 with steam or another hot medium by means of one or more jet nozzles.

I claim:

1. Means for picking up frozen bodies by adhesion from a freezing mold, said mold having inner sides and being open at the top end thereof and filled with a frozen substance of inhomogeneous fibers or piecelike consistency, said means comprising a pickup member having a side adapted for adherance by freezing to the surface of the substance in the mold, said side being provided over its entire area with a plurality of uniformly spaced parallel grooves of U-formed sections and of uniform width separated by uniformly spaced parallel ridges having flat tops and of a width corresponding to the width of said grooves, the transverse dimensions of said grooved side being smaller than the transverse dimensions of said open top end of said mold, said pickup member further having engaging means secured thereto at a position opposite to said grooved side and adapted for lifting and lowering said pickup member in relation to said mold.